July 1, 1958 R. SCHECHTER 2,841,074
SAUSAGE GRILLING AND VENDING MACHINE
Filed April 11, 1955 10 Sheets-Sheet 1

Inventor:-
Richard Schechter,
by Pierce, Scheffler & Parker,
Attorneys.

July 1, 1958 R. SCHECHTER 2,841,074
SAUSAGE GRILLING AND VENDING MACHINE
Filed April 11, 1955 10 Sheets-Sheet 2

July 1, 1958
R. SCHECHTER
2,841,074
SAUSAGE GRILLING AND VENDING MACHINE
Filed April 11, 1955
10 Sheets-Sheet 3
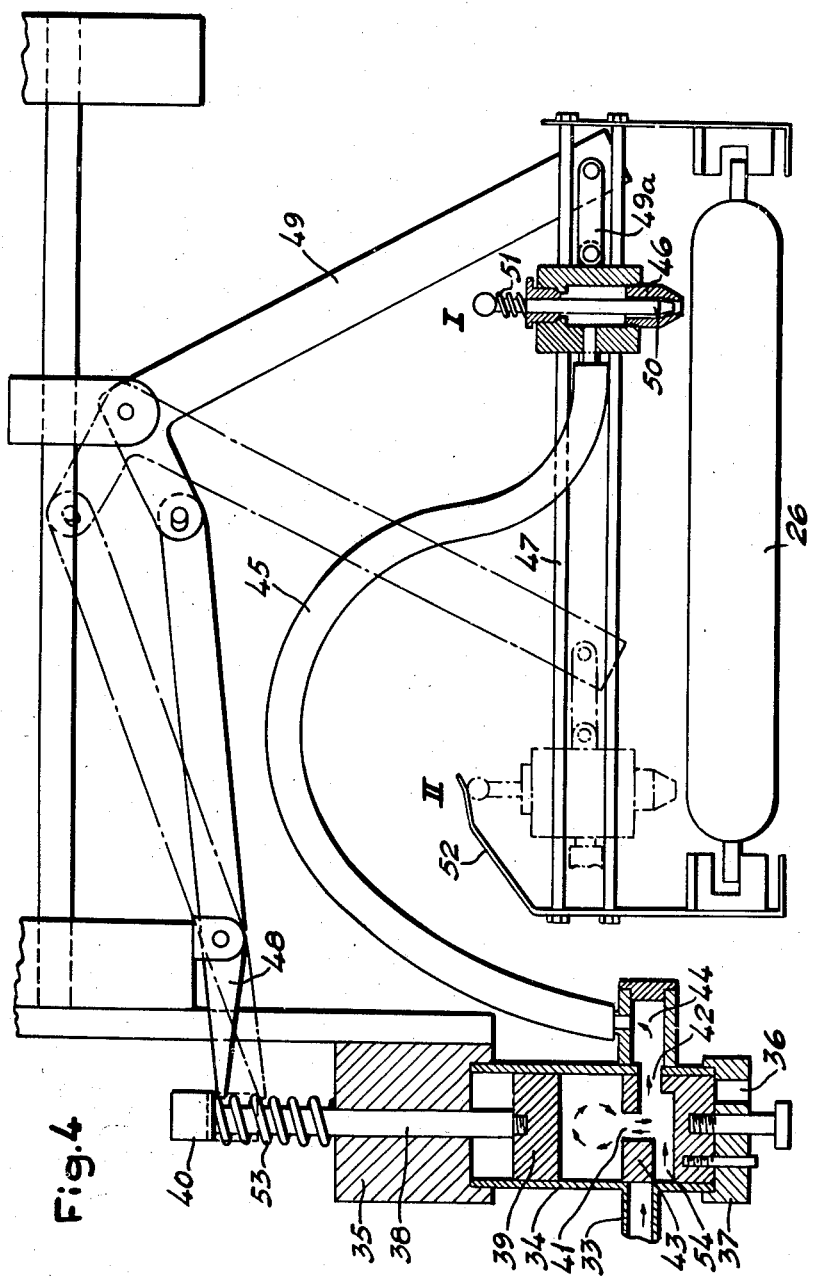

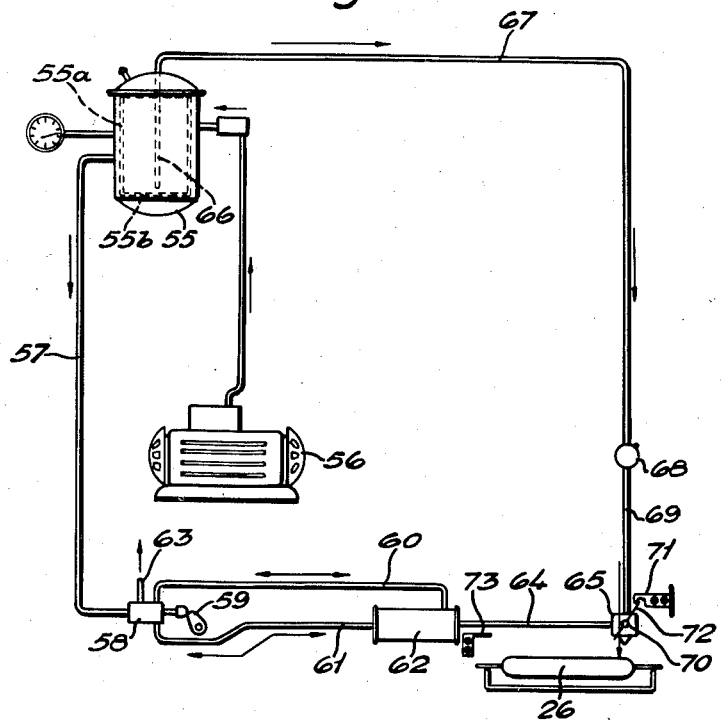

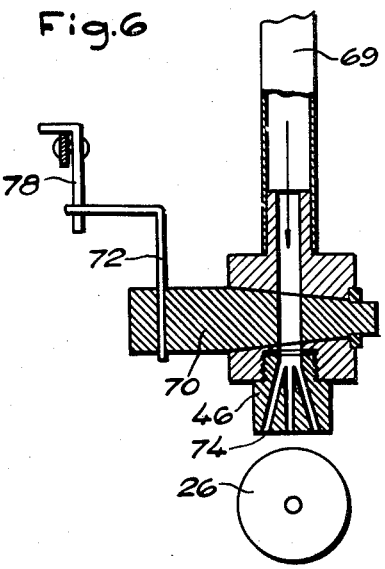
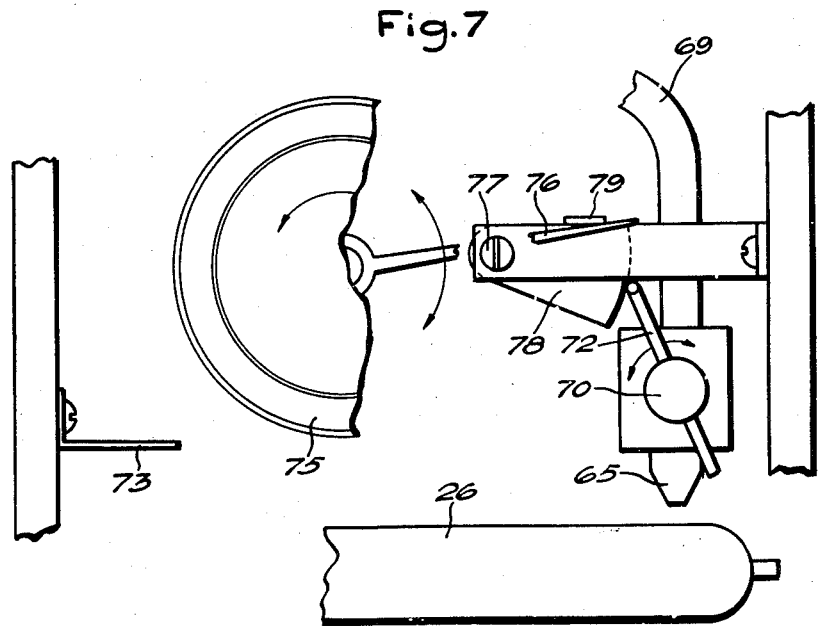

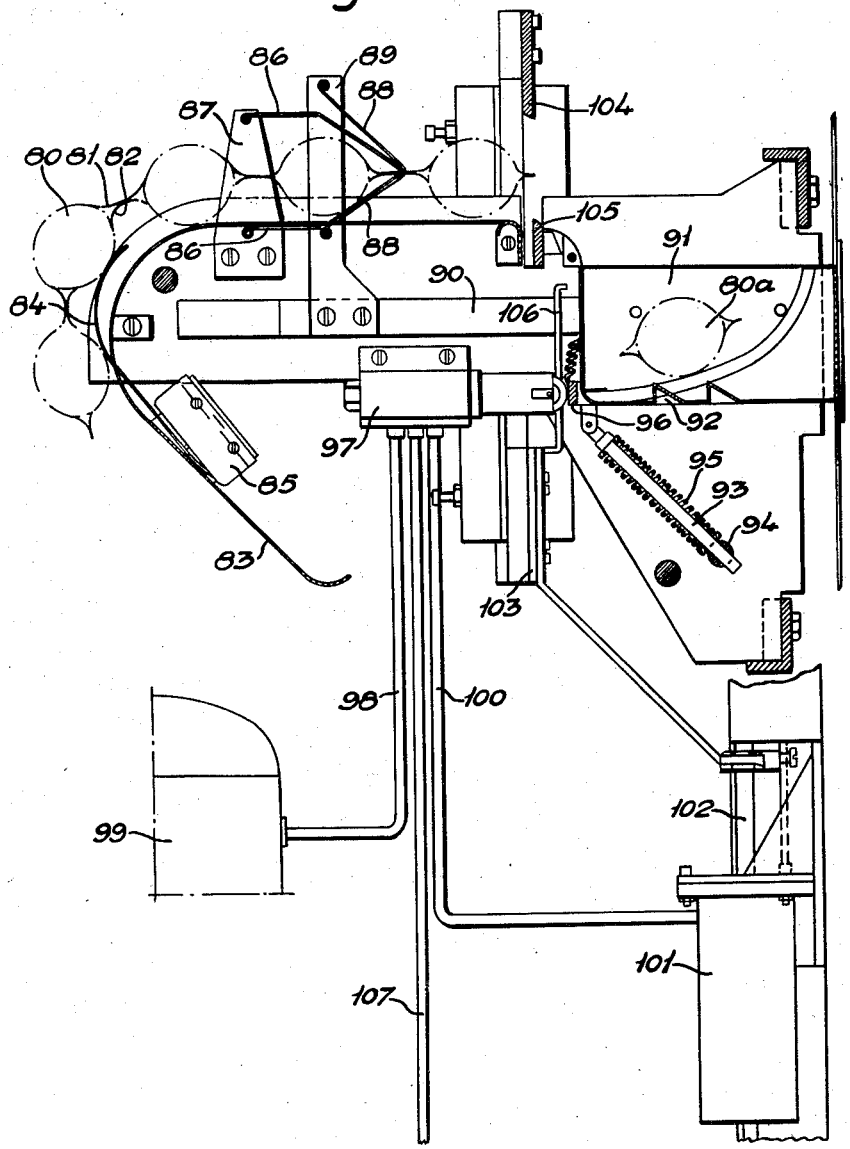

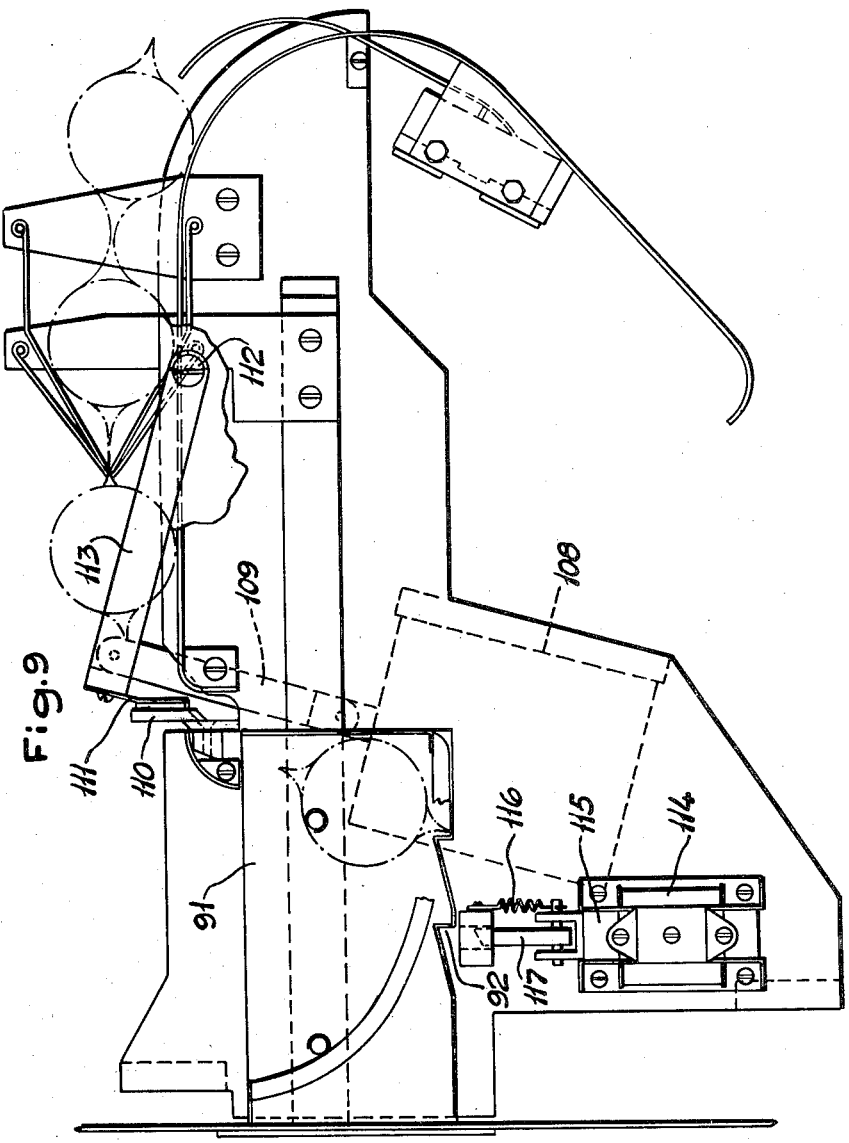

July 1, 1958 R. SCHECHTER 2,841,074
SAUSAGE GRILLING AND VENDING MACHINE
Filed April 11, 1955 10 Sheets-Sheet 8
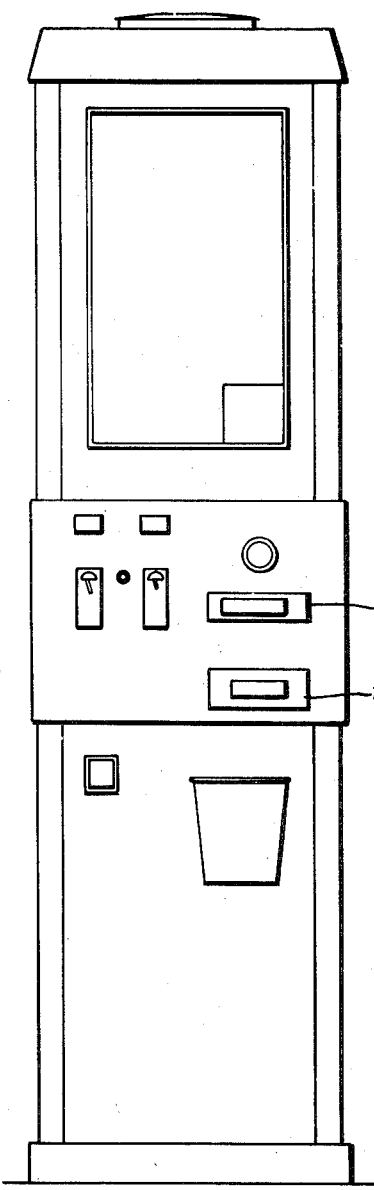
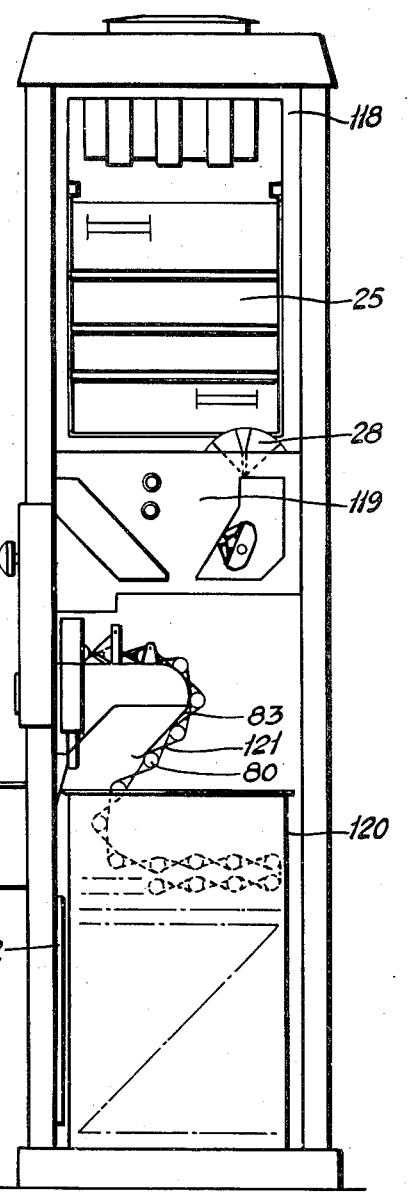

July 1, 1958 R. SCHECHTER 2,841,074
SAUSAGE GRILLING AND VENDING MACHINE
Filed April 11, 1955 10 Sheets-Sheet 9

INVENTOR
Richard Schechter
BY Pierce, Scheffler & Parker
ATTORNEYS

2,841,074
SAUSAGE GRILLING AND VENDING MACHINE

Richard Schechter, Uppsala, Sweden, assignor to AB Thorell & Persson, Uppsala, Sweden Application April 11, 1955, Serial No. 500,585

Claims priority, application Sweden September 23, 1954

6 Claims. (Cl. 99—355)

The present invention relates to a sausage grilling and vending machine, the invention being substantially characterized by a motor, which is started in a manner well known per se by inserting coins in a slot, means operated by the said motor for extracting sausages from a magazine, for grilling the sausage and for feeding the same to a delivery position, guiding means being provided for guiding the ends of sticks, inserted axially in the sausages, during the transport from the grilling to the delivery position, so that the sausage itself does not come into contact with parts of the machine after being grilled.

The magazine may for example contain 500–1000 sausages and each magazine may be provided with a shutting device which is opened and delivers one sausage at a time to a conveyor belt, which is driven automatically when a coin is inserted. When one magazine is empty, the next magazine is connected-in automatically, and so on, which can be carried out by well known switch-over devices. The vending machine can be arranged to start, when a coin is inserted, and to grill one sausage at a time, supply it with mustard, and deliver it at the front side of the vending machine. For sanitary reasons the sausages are threaded on the said sticks, which may have a diameter of 4 mm. and a length of 170 mm. The vending machine is preferably combined with a machine for vending rolls or bread, which when a coin is inserted in a slot, releases a drawer in which a roll is delivered.

Embodiments of the invention are shown by way of example in the accompanying drawings, in which Fig. 1 shows the grilling device.

Figs. 4 and 5 show two different embodiments of a device serving the purpose of spraying mustard on the sausage.

Fig. 6 shows a section of a spraying nozzle belonging to the device according to Fig. 5.

Fig. 7 shows a device for opening and closing the spraying nozzle according to Fig. 6.

Figs. 8 and 9 show two embodiments of a device for delivering bread.

Fig. 10 shows the front side of the casing of the vending machine.

Fig. 11 shows a diagrammatical vertical section through the said casing, illustrating how the different elements making parts thereof are placed.

Figure 1:
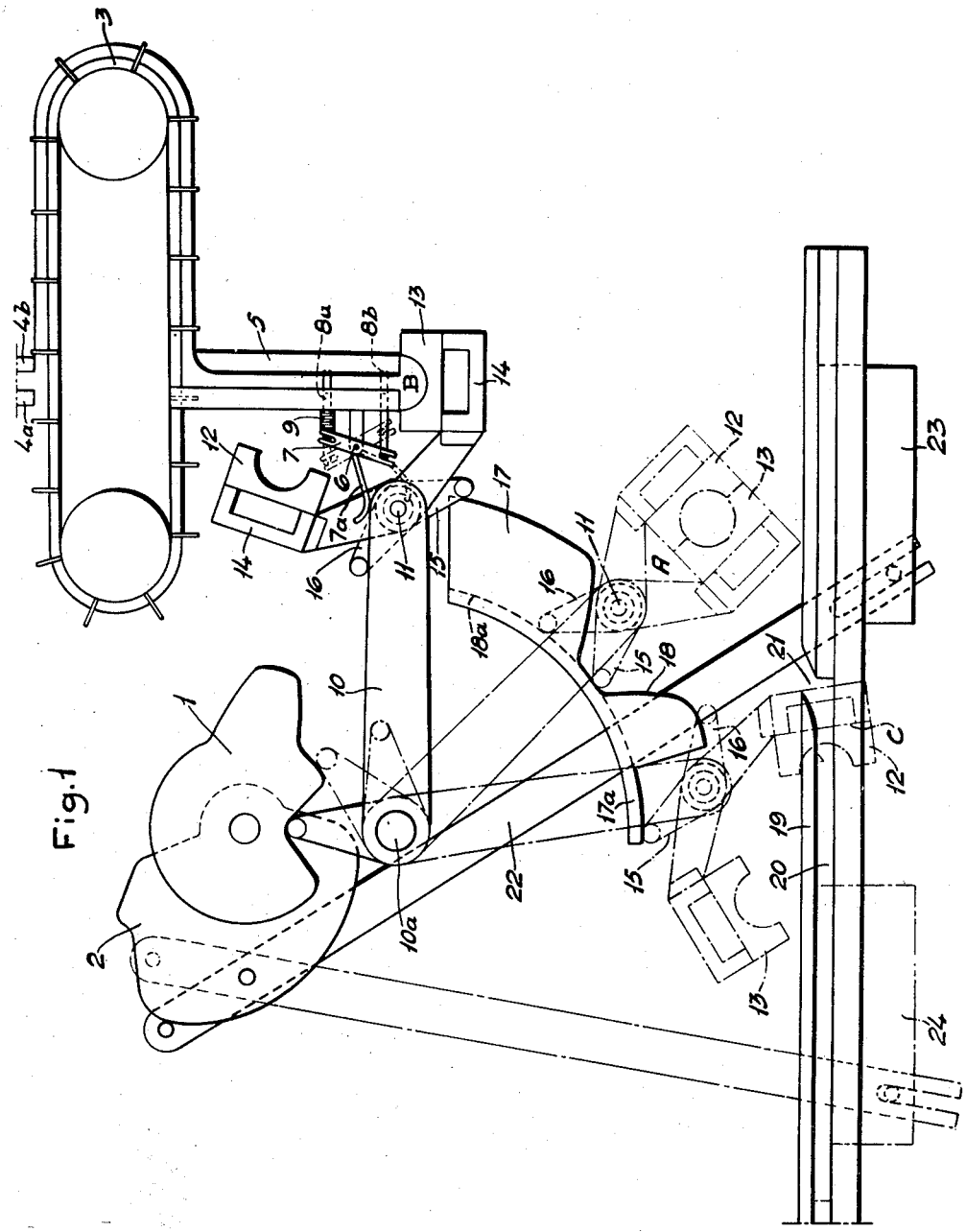

The vending machine illustrated in Fig. 1 is provided with a standard coin-controlled starting device (not shown) for starting a drive motor $1b$ by inserting a coin in an opening provided for this purpose. Two cam discs 1 and 2, connected with each other on shaft $1a$, and a chain conveyor 3 are driven by the motor $1b$ through suitable gearing means connected to the shaft $1a$. Above the chain conveyor there are a number of vertical magazines for sausages, which magazines are each provided with two similar guides, one, imagined to be located above the plane of the drawing, being shown, consisting of two bars $4a$, $4b$, which guide between them one end of sticks inserted in the sausages. The other end of the stick is guided by the second guide, which is imagined to be located below the plane of the drawing. The conveyor is provided with drivers through which it is divided into compartments, and it is carried in the clockwise direction, each time the motor is started, a distance which equals the distance between two drivers. By means of a device, not shown, for example similar to the below-described shutting device, driven by a cam disc, one sausage is dropped from the magazine into the conveyor each time the motor is started, so that one sausage is to be found in each compartment to the right of the magazine. At the same time the conveyor delivers a sausage to a secondary magazine, for example vertical guides 5, which guide the ends of the sticks in the same way as the guides $4a$, $4b$. The sausages in the guides 5 are carried by a shutting device consisting of two rockers 7 attached to a turnably mounted shaft 6. Each rocker 7 is arranged so as to guide with its ends two horizontally movable pins $8a$, $8b$ and is normally held by a spring 9 in such a position (dashed lines) that the upper pin $8a$ is drawn out of the guide and the lower pin $8b$ is inserted in the guide, so that the lowermost sausage with its stick ends rests on the two lower pins $8b$ of the shutting device. If the secondary magazine, that is, the guides 5, is meant to contain only one sausage, only the pins $8b$, but not the pins $8a$, are required.

When, as mentioned above, the motor is started, the cam disc 1 actuates a grill arm 10 in such a manner that it moves upwards from its normal intermediate position A to the position B. The grill arm 10 is provided with two grill irons 12 and 13 pivoting on a shaft 11, which grill irons are heated by means of an electric heating resistance (not shown) provided in a heat insulating casing 14 connected to the respective grill arm, and preferably held constantly heated, or in some other way. Each grill arm is provided with a guide arm, 15 or 16 respectively, which slide on and are guided by their respective stationary cams 17 and 18 respectively in the following manner: When the grill arm 10, as stated, is swung upwards from the position A to the position B, the guide arm 15 slides onto the cam 17, so that the grill iron 12 is swung up in the counter clockwise direction relatively to the grill arm 10, while the guide arm 16 slides onto the portion $18a$ of the cam 18, which portion is concentrical with the shaft $10a$ of the grill arm 10, until the grill iron 13 reaches the guides 5, whereby the motion of the grill arm is interrupted. At the end of this movement of the grill arm the said arm actuates an operating arm $7a$ connected with the shutting device, which is thereby turned in the clockwise direction, so that the upper pins $8a$ are inserted under the second lower stick at the same time as the lower pins $8b$ are drawn out, so that the lowermost one falls down into the semicircular chamber in the grill iron 13. Thereafter the grill arm 10 is carried downwards by the said cam disc 1 and passes beyond the position A, whereby the grill arm 15 passes to the portion $17a$ of the cam 17, concentrical with the portion $10a$, so that the grill is closed. At the continued movement of the grill arm 10 the grill irons are moved downwards between two guides 19, one of them only being shown in the drawing, covering the other one, besides which the guide arm 16 slides onto the cam 18, so that the grill iron 13 is swung up, and the grill is opened (position C). The guides 19 are provided with grooves 20 facing each other, in which the sticks are inserted at 21, so that they will rest in the groove 20. The grill arm 10 now is moved back by the cam disc 1 in the counter clockwise direction, and the grill is closed, whereafter the grill arm stops in the position A. At the same time the cam disc 2 connected with the cam disc 1 has moved, by means of a bar 22 guided thereby, a slide 23 guided in the grooves 20 from the position indicated by continuous lines to the position 24 indicated by dashed lines, the sausages having been carried to an opening of delivery (not shown).

Figure 2:
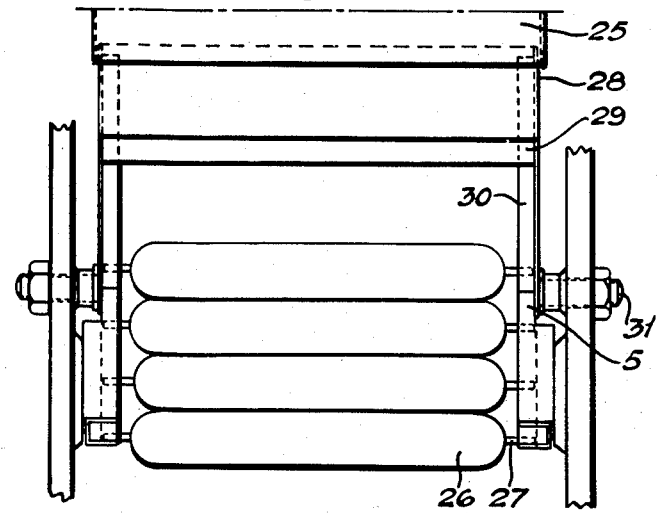
Figs. 2 and 3 show a device for feeding sausages from a magazine to the grilling device, viewed in two directions which are mutually at right angles with each other.
Figure 12:
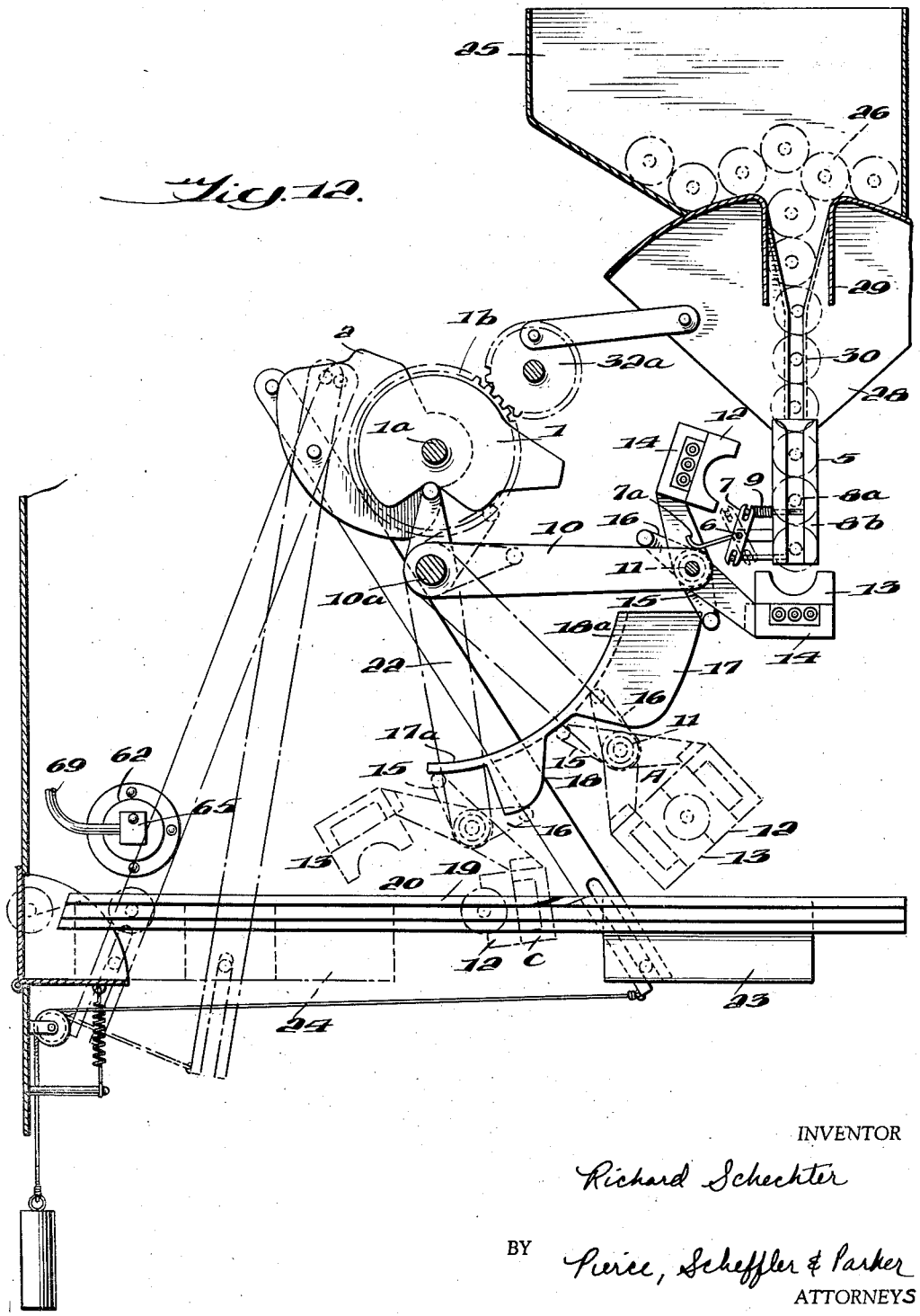
Fig. 12 is a side elevational view of a complete embodiment of my grilling device including the magazine and cradle feed means of Fig. 3 and the mustard applying means of Fig. 5.
Figure 13:
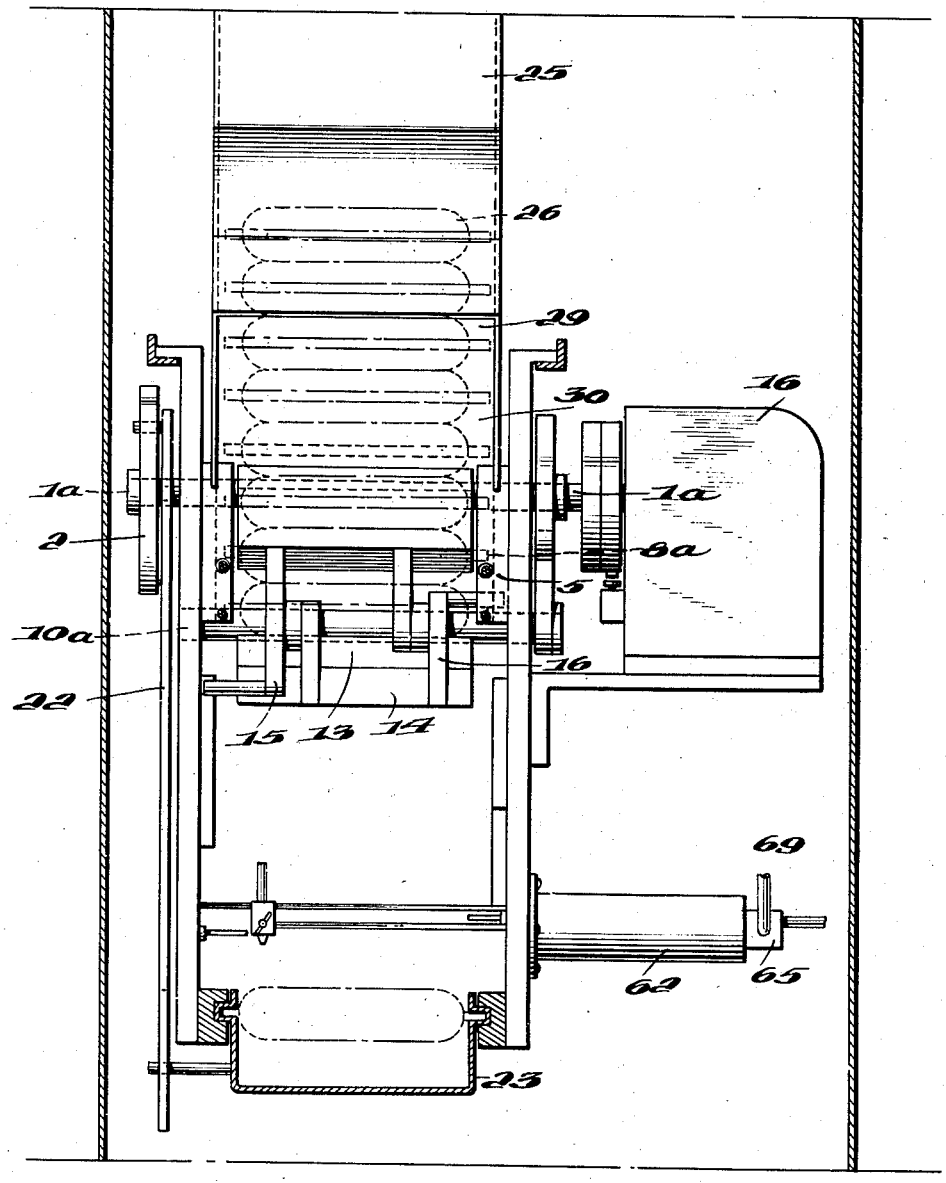
Fig. 13 is an end view of the embodiment of Fig. 12.

Fig. 2 shows a device for feeding the sausages from a magazine 25 to the guides 5 (shown also in Fig. 1), the conveyor 3 (Fig. 1) being unnecessary. The magazine 25 contains the sausages 26 which have wooden sticks 27 inserted therein in their longitudinal direction, extending about 10 mm. from each end of the sausage. A "cradle" 28 the upper portion of which is provided with guide plates 29 for the sausages, of the same length as the sausages, at right angles to the plane of the drawing and at a distance from each other which is 5 mm. greater than the diameter of the sausages, and which has at its lower portion guides 30 for the ends 27 of the sticks, which guides have an upper extension which diverges upwardly to the same width as the space between the plates 29, is pivoted on a shaft 31 near the lower end of the guides 30, and is connected by means of a link 32 with an eccentric 32a (Fig. 12) driven by the motor, so that a reciprocal motion is imparted to the said cradle, whereby the sausages kept in the magazine are fed one by one into the guides 30. From these guides the sausages fall down into the stationary guides 5 which at their lower ends are provided with a closing and opening device with a rocker 7 according to Fig. 1.

The device illustrated in Fig. 4 for spraying mustard on the sausage is started by the same coin as that which starts the grilling device described above. The member, for example a shaft with a cam disc driven by the motor, which operates the mechanism of the grill device, may also operate the spraying device, for example by means of a cam disc mounted on the same shaft, whereby the desired relationship with regard to feeding is obtained between the functioning of this device and the grill device described above. From a container, not shown, holding for example 1–5 kg., mustard is conducted through the tube 33 to a cylinder 34 closed at both ends by means of a holder 35 and a lid 37 provided with an opening 36, which are held together by three screws (not shown). In a bore in the holder 35 a spindle 38 is slidably arranged which carries a piston 39. The head 40 of the spindle slides against a cam disc (not shown) which is driven one revolution each time the motor 1b is started. Then the cam disc pushes down the spindle 38 and the piston 39. The piston 39 presses the mustard through openings 41, 42, communicating with each other, in a piston 43 displaceable in the cylinder 34 between two limits, and into the tube 44. The tube 44 is connected by means of a flexible tube 45 with a nozzle 46 which is movable along a guiding device, preferably two steel bars 47.

When the head 40 is moved downwards it brings with it a lever 48 which via a lever 49 and a link 49a moves the nozzle 46 from the position I to the position II, during which movement the subjacent sausage 26 is sprayed with mustard. The device for feeding the sausage should be of such a kind, that during the period, when the nozzle is moved from the position I to the position II, the feeding of the sausage ceases, and the sausage remains in a determined position under the nozzle for a period corresponding to the movement of the nozzle from the position I to the position II. In the position II a shutoff valve 50 provided in the nozzle 46 is closed against the action of a spring 51 due to the fact that its upper end is moved under an inclined guide surface 52. While the nozzle 46 is in position II, the valve 50 thus being closed, the cam of the cam disc passes the spindle head 40 whereby the piston 39 again is moved upwards by the action of the spring 53 provided between the holder 35 and the head 40. Due to the fact that the valve 50 is closed a vacuum is obtained in the cylinder 34, and the movable piston 43 follows upwards and closes the opening 42 and thus also the tube 44, so that the tube 33 which till now has been closed, will come into communication with an opening 54, provided in the movable piston 43, and communicating with the openings 41 and 42, so that mustard is sucked into the cylinder 34 through the openings 54 and 41, besides which the nozzle 46 is returned to the position I by means of the levers 48 and 49. When the piston 39 is again moved downwards, the movable piston 43 is also pressed downwards by the action of the mustard and closes the opening from the tube 33 simultaneously with opening the communication with the tube 44.

Instead of the piston 43 valves may be provided to replace the openings 54 and 42, and which valves are opened when actuated to the right but are closed when actuated to the left.

Fig. 5 illustrates another embodiment of the device for spraying mustard on the sausage. In a pressure tank 55 the pressure is held by means of an air compressor 56 at about 1.8 kg./cm.² The compressor is started automatically by means of a switch, not shown in the drawing, actuated by the pressure in the tank, when the pressure has been reduced for example to 1.4 kg./cm.², and stops when the pressure has reached, for example 2 kg./cm.² From the pressure tank a conduit 57 leads to a pressure valve 58 operated by a cam disc 59 attached to the shaft which operates the mechanism of the machine. The pressure valve is a two-way valve, the two outgoing conduits 60 and 61 of which are each connected to the respective ends of the air cylinder 62, so that, when the valve connects one or the other of these conduits, the piston (not shown) provided in the air cylinder is driven to the left, respectively to the right. The air consumed is removed through the opening 63. To the piston rod 64 there is attached a nozzle 65 provided with a shut-off valve in the form of a cock, which nozzle is moved in the longitudinal direction of the sausage 26 by the movement of the piston.

In the pressure tank 55 a mustard container 55a is enclosed, the bottom of which is designated by 55b. A tube 66 is inserted through the lid of the pressure tank, the said tube extending for example as far as 1 cm. above the bottom 55b of the container. This tube is connected via a flexible tube 67 to a cock 68 provided with a knob by means of which it can be closed or more or less opened. The cock is connected with the nozzle via a flexible tube 69.

By the pressure in the pressure tank mustard is pressed through the tube 66 and the flexible tube 67 to the cock 68. If this is opened, mustard is pressed to the nozzle 65. When the piston moves to the left, the cock 70 in the nozzle 65 is turned owing to the fact that the hook 71, when this movement is started, retains the upper end of a lever 72 attached to the cock 70, so that the cock is opened and mustard is sprayed on the sausage during the movement of the nozzle to the left. When the nozzle has passed the sausage, the cock 70 is closed by a fixed stop member 73 which actuates the lower end of the lever 72. Thereafter the nozzle is moved to the right to its original position by the action of the cam disc 59 and the piston of the air cylinder 62, whereby the upper end of the lever 72 enters behind the hook 71, as shown in the drawing.

Figs. 6 and 7 show in more detail an embodiment of the spraying nozzle and its operating means shown in Fig. 5. The nozzle 46 which like the cock 70 is shown in section in Fig. 6 is in this embodiment provided with three channels 74 through which mustard is sprayed out. The turnable adjustment knob, shown in Fig. 7, which is porvided on the front side of the casing of the machine, is connected with a lever 76 on which a latch member 78 mounted at 77 rests by means of a shoulder 79. When the nozzle 46, in the way described above, is moved to the left along the sausage 26, the lever 72 hits the latch 78, as shown in Fig. 7, and turns the cock 70, so that it is opened, and mustard is sprayed on the sausage 26. In the position, as shown, of the knob 75 the cock is opened entirely, so that a full portion of mustard is put on the sausage. When the nozzle has been moved to the other end of the sausage, the lower end of the lever 72 hits the stationary shoulder 73, and the cock is shut, whereafter the nozzle returns to its original position, and the latch 78 is lifted up by the upper end of the lever 72, so that this lever can pass, after which the latch 79 falls down behind the same to the initial position shown in Fig. 7.

If the knob 75 is so adjusted, that the latch 78 is lifted, for example half-way, the cock will be only half-open at the movement of the nozzle, and if the latch is lifted up as much as possible, the cock is not turned. In the former case half a portion of mustard is obtained, and in the latter case no mustard at all is obtained.

The cock may be made in such a manner that, when in its middle position, the mustard is fed only through, for example the central opening. If much mustard is desired, the knob is adjusted so, that all the channels 74 are open, whereby a broad layer of mustard of about 15 mm. breadth is put on the sausage. By turning the knob the breadth of this layer can be reduced to a narrow string or the feeding of mustard can be entirely shut off. Due to the fact that the nozzle has three channels and an adjustment knob on the front side of the machine, the customer himself can decide the quantity of mustard desired.

Figs. 8 and 9 show two embodiments of a device for vending bread, which device is combined with the machine for vending grilled sausages described above, and which comprises a drawer in which a roll is delivered when the drawer is drawn out, the latter being normally barred by a locking member which is released by putting a coin into an opening therefor. Preferably a special opening with appurtenant mechanism is provided for the bread vending machine.

According to Fig. 8 the bread 80 is packed in a conveyor belt consisting of two strips of paper 81 and 82, which are glued together, so that pockets are formed, suitable for enclosing a roll in each pocket (like a cartridge belt), whereby the bread is well protected. The conveyor belt provided with bread is stored in a plurality of layers in a magazine (not shown), which is heated to a temperature of 25–30° C. by an electrical heating element, and possibly a thermostat. From the magazine the conveyor belt runs over a slide plate 83 and a contact arm 84 which is connected with a contact device 85, which, when there is no more bread, disconnects the bread apparatus and simultaneously actuates a magnet, which shifts a sign on the front side of the machine, that shows "no sale" (not shown in the drawing). The bread conveyor passes between two stop flaps 86 which are swingably mounted in holders 87 screwed on the machine frame and possibly spring-actuated against each other, and between two feeding flaps 88 which in a similar manner are spring-actuated and are swingably mounted on holders 89, which are screwed on rulers 90 attached to a bread delivery drawer 91. By inserting a coin in an opening intended therefor a latch member (not shown) is brought out of engagement with the latch recesses 92 of the drawer 91, so that the drawer can be drawn out. A bar 93 which is hinged to the drawer with one end and passes with its other end through a turnable shaft 94 keeps the drawer closed by means of a compression spring 95 provided thereon, when the bar 93 is positioned to the left of the intermediate position, but presses the drawer outward when it is positioned to the right of the intermediate position. At the same time as the drawer is drawn out the conveyor belt with the bread is driven due to the fact that the holder 89 with the feeding flaps 88 takes part in the movement of the drawer.

After the drawer has been drawn out, a roll 80a, previously fed into the drawer, can be taken out. When the drawer is pushed in, the stop flaps 86 hold the bread conveyor in a firm position, while the feeding flaps 87 slide over the bread fed forwards and assume their position shown in the drawing. When the drawer is pushed in, it actuates, via an intermediary member 96 which preferably is suspended on the drawer in a resilient manner, the air valve 97, which, through a conduit 98, is connected with an air container 99 in which the pressure is maintained for example at about 3.5 kg./cm.² by means of a compressor (not shown). Then the valve 97 is adjusted, so that the said conduit 98 is connected with a conduit 100 connected with the upper end of a pressure cylinder 101, whereby the piston of the cylinder 101 is depressed and a slide 103 connected to the piston rod 102 drives a knife 104 fixed to the slide down against a stationary knife 105 and cuts off the belt, so that a pocket with bread loosens and falls down into the drawer 91.

At the same time as the slide with the knife 104 cuts off the strip of paper the above-mentioned member 96 is depressed by means of a releaser 106 attached to the slide 103, so that the valve 97 is released and restored by a spring (not shown) provided therein, and shifts the conduit 98 from the conduit 100 to a conduit 107 connected to the lower end of the cylinder 101, whereby the piston rod 102 with the slide 103 and the knife 104 are restored to their upper position.

The device shown in Fig. 9 differs from that shown in Fig. 8 therein that the belt is cut off by means of an electro-magnet 108 magnetized by means of a switch, not shown, which is closed when the drawer 91 is pushed in, whereby the iron core of the magnet by means of a link 109 pulls the knife 110 downwards, which by means of a spring 111 is fixed to an arm 113 mounted at 112, which arm is normally held in a swung-up position by means of springs (not shown).

Furthermore an electro-magnet 114 is shown in Fig. 9 the iron core 115 of which is normally held in a lifted-up position by a spring 116 and carries a pin 117 which engages a recess 92 (Figs. 8, 9) in the drawer 91, whereby the drawer is prevented from being pulled out. When a coin is inserted, a switch (not shown) is actuated which connects the winding of the magnet 114, whereby the magnet is magnetized and pulls down the pin 117 so that the drawer can be pulled out. The latch device in Fig. 8 may be of the same kind.

Figure 3:
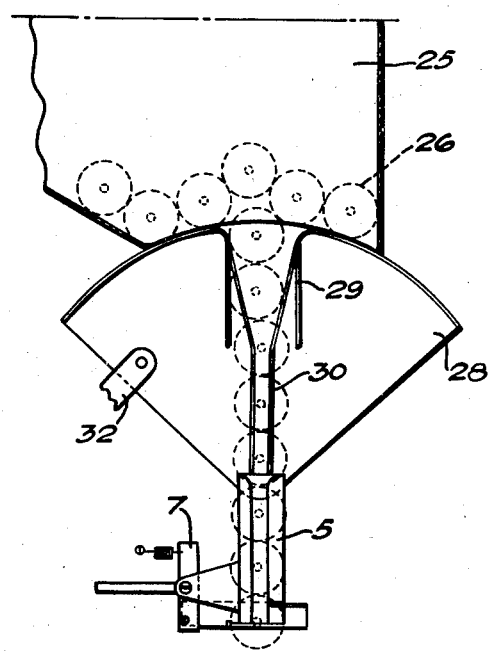

Fig. 10 shows as an example a front view of the machine and Fig. 11 a diagrammatical section thereof. The machine shown in Figs. 10 and 11 contains, preferably, in its upper portion an apparatus comprising a magazine 25 for about 400 sausages having sticks inserted axially therein (according to Figs. 2 and 3). A cooling unit 118 is provided for maintaining the temperature of the sausages in this magazine for instance at +6° C. From the magazine 25 the sausages are transported by means of a transferring device which may consist of a "cradle" 28 according to Figs. 2, 3 to a grilling device 119 according to Fig. 1. Furthermore the machine contains, preferably in its lower portion, an apparatus according to Fig. 8 or 9, comprising a magazine 120 for bread 80 positioned in pockets between two strips of paper glued together and forming a belt 121, like a cartridge belt, which runs over a slide plate 83. A heating element 122 serves as source of heat for this magazine. The shown machine is at its front side provided with signs 123, 124, for sausages as well as for bread, which can be operated by means of electro-magnets in the way described in connection with Fig. 8 with respect to bread, so that an indication "no sale" is visible, when there is no more sausage or bread in the respective magazines. The machine is at its front side provided in the usual way with openings for coins.

The devices described and shown are only intended as examples, several embodiments being possible within the scope of the invention.

Having now described my invention, what I claim as new and desire to secure by Letters Patent is:

1. A grilling and vending machine for a sausage having a stick extending longitudinally therethrough comprising a frame, a magazine secured to said frame, said magazine containing a plurality of the sausages and having a discharge opening in the lower portion thereof, a cradle pivotally mounted beneath said discharge opening, spaced vertical guide means in said cradle for guiding the stick portions at either end of the sausages to conduct the sausages vertically downwardly in a superimposed manner, lock means for retaining the lowermost sausage in said cradle guide means, trip means for releasing said locking means to release said lowermost sausage, spaced horizontal guide elements positioned beneath the cradle, and means for actuating said trip means and for simultaneously grilling and transporting said sausage from said cradle to said spaced horizontal guide elements comprising a lever pivotally connected to said frame, a pair of grill irons pivotally connected to one end of said lever, said grill irons having recesses therein adapted to receive said sausage therebetween, motor-driven cam means for periodically oscillating said lever to cause said grill irons to be moved from said cradle to said spaced horizontal guide elements, said lever being arranged to trip said lock-releasing trip means, and cam means secured to said frame for opening said grill irons to receive said lowermost sausage when said lever is adjacent said cradle, for closing said grill irons together when said lever is moved toward said spaced horizontal guide elements, and for opening said grill irons when said lever is adjacent said horizontal guide elements.

2. A grilling and vending machine as defined in claim 1 wherein said cradle has a cylindrical upper wall with an opening therein to receive sausages from the magazine, and means for oscillating said cradle about the axis of the cylindrical surface.

3. Apparatus as defined in claim 1 and further including lever means connected to said motor-driven cam means for transporting the sausage along said spaced horizontal guide elements.

4. Apparatus as defined in claim 1 and including in combination a seasoning fluid applying device actuated by said motor-driven cam means, said seasoning applying device comprising guide means transversely arranged with respect to said spaced horizontal guide elements, a nozzle slidably mounted on said transverse guide means and adapted to move longitudinally of said sausage, linkage means actuated by said motor-driven cam means for moving said nozzle along a sausage supported by the spaced horizontal guide elements, a pump for feeding said seasoning fluid under pressure and flexible hose means connecting said pump to said nozzle.

5. Apparatus as defined in claim 4 wherein said seasoning fluid applying device includes a cylinder having a piston operated by said motor-driven cam means, and valve means in said flexible hose means for enabling feeding of seasoning fluid in one direction only from the pump to the nozzle.

6. Apparatus as defined in claim 5 wherein said cylinder has a second piston movable therein between two limits, said cylinder having communicating openings in the wall thereof and arranged so as in one position of the piston to open one of the connections and in another position of the piston to open the other connection, said second piston being operable by pressure variations created by the movement of said cam-driven piston.

References Cited in the file of this patent

UNITED STATES PATENTS

| | | |
|---|---|---|
| 1,716,266 | Flamm | June 4, 1929 |
| 1,749,414 | Christianson | Mar. 4, 1930 |
| 2,005,395 | Rothfeld | June 18, 1935 |
| 2,142,390 | Zerr | Jan. 3, 1939 |
| 2,244,670 | Benedict | June 10, 1941 |
| 2,333,175 | Henley | Nov. 2, 1943 |
| 2,384,863 | Warner | Sept. 18, 1945 |
| 2,531,238 | Tandler et al. | Nov. 21, 1950 |
| 2,602,392 | Panken | July 8, 1952 |
| 2,715,372 | Whitsel | Aug. 16, 1955 |
| 2,718,188 | Read et al. | Sept. 20, 1955 |

FOREIGN PATENTS

| | | |
|---|---|---|
| 58,791 | Denmark | June 23, 1941 |